United States Patent [19]
Schreiber

[11] Patent Number: 5,649,429
[45] Date of Patent: Jul. 22, 1997

[54] AIR CONDITIONER FOR A MOTOR VEHICLE

[75] Inventor: Roland Schreiber, Stuttgart, Germany

[73] Assignee: Mercedes-Benz AG, Germany

[21] Appl. No.: 677,044

[22] Filed: Jul. 3, 1996

[30] Foreign Application Priority Data

Jul. 3, 1995 [DE] Germany ............ 195 24 199.1

[51] Int. Cl.$^6$ ................................................. B60H 1/32
[52] U.S. Cl. .............................. 62/186; 52/126; 52/129
[58] Field of Search ........................... 62/129, 186, 187, 62/89, 125, 126, 161, 177, 180

[56] References Cited

U.S. PATENT DOCUMENTS

| | | | |
|---|---|---|---|
| 4,493,194 | 1/1985 | Briccetti | 62/180 |
| 5,009,076 | 4/1991 | Winslow | 62/129 |
| 5,186,014 | 2/1993 | Runk | 62/129 |

FOREIGN PATENT DOCUMENTS

| | | | |
|---|---|---|---|
| 44 26 339 | 8/1995 | Germany . | |
| 148611 | 11/1980 | Japan | 62/129 |

*Primary Examiner*—William Doerrler
*Attorney, Agent, or Firm*—Evenson, McKeown, Edwards & Lenahan P.L.L.C.

[57] ABSTRACT

The invention relates to an air conditioner for motor vehicles, with a compressor, a condenser, an expansion valve, and an evaporator, all traversed by a refrigerant in a refrigerant circuit in the above sequence. An air distribution duct leads to the vehicle interior, where the evaporator is located and can be exposed to an air flow. The air flow can be adjusted optionally by means of a servo-controllable flap to supply fresh air or to recirculate the air. A pressure sensor is located between the evaporator and the expansion valve of the refrigerant circuit for safety reasons, to detect the refrigerant pressure in the vicinity of the evaporator. If the refrigerant pressure drops below a presettable minimum acceptable limiting value, the sensor generates a pressure signal that sets the flap controlling the air stream to supply fresh air and activates the corresponding blower as well as an optical and/or acoustic warning device.

5 Claims, 1 Drawing Sheet

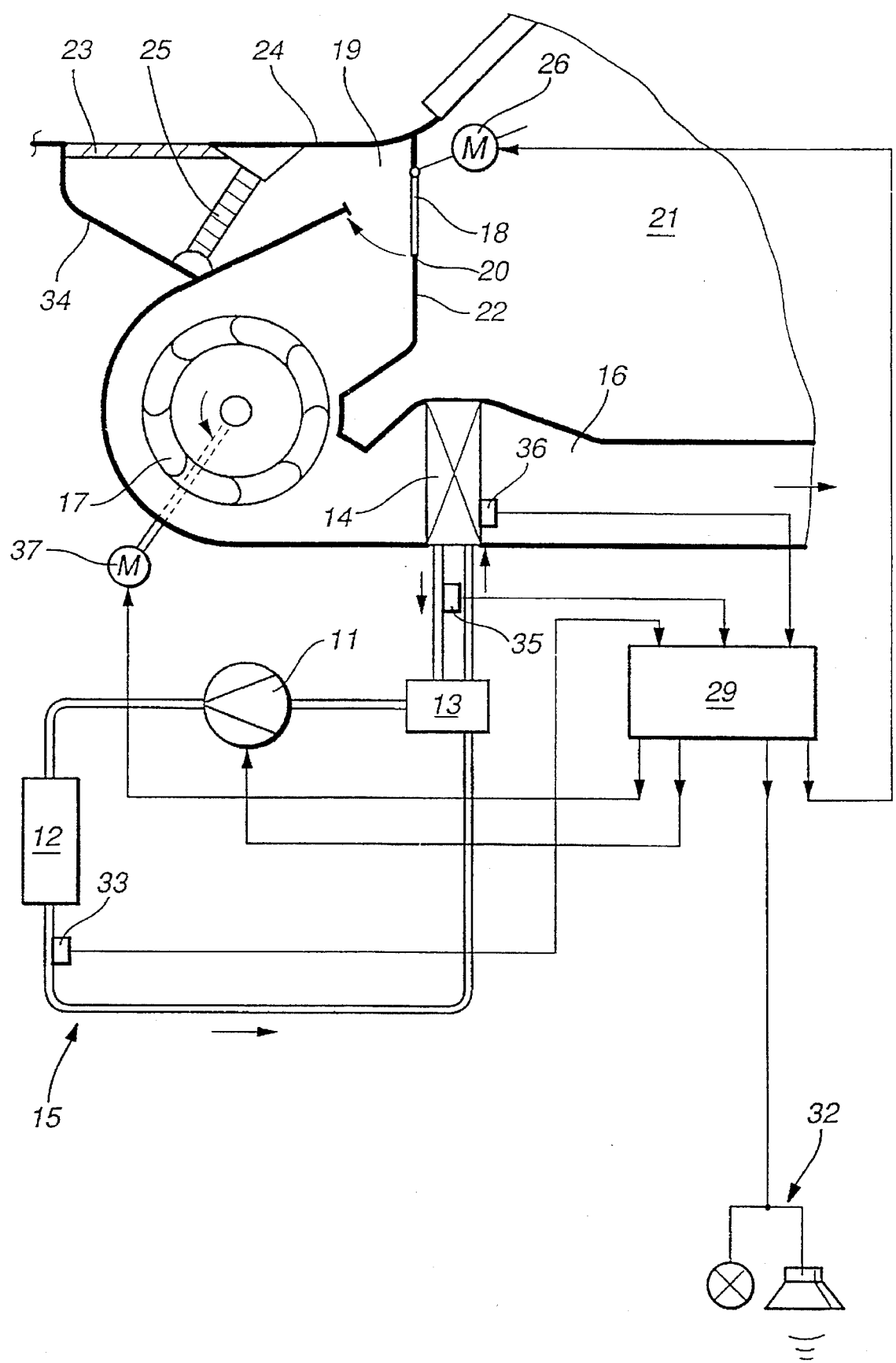

AIR CONDITIONER FOR A MOTOR VEHICLE

BACKGROUND AND SUMMARY OF THE INVENTION

The invention relates to an air conditioner for a motor vehicle having an arrangement for detecting refrigerant leaks and taking remedial measures in response thereto.

Unpublished German patent application to DE 44 26 339 A1, discloses an arrangement which deals with a safety aspect of air conditioners that use a refrigerant that is environmentally acceptable but flammable (for example, a hydrocarbon). When such a refrigerant is used, vehicle occupants may be endangered in the event of a leak in the refrigerant circuit, because a flammable mixture of air and refrigerant forms in the passenger compartment that can be ignited by a spark. In this patent application, it was proposed to eliminate this danger by continuously monitoring the air blown through the evaporator for any hydrocarbons in the air stream, using a suitable gas sensor, shutting off the refrigerant circuit if required.

The object of the present invention is to provide an improved arrangement for protecting against refrigerant leaks in a vehicle air conditioner, such that in the event of a leak in the refrigerant circuit the vehicle occupants will not be endangered and will be warned in time, with monitoring being effective even when the air conditioner is not switched on and/or an air stream is not conducted into the passenger compartment.

This object is achieved according to the invention, which can detect a leak in the refrigerant circuit, independently of whether the air conditioner is switched on or off, by monitoring the pressure in the refrigerant circuit. If the pressure drops below a minimum value, the air conditioner is shut off and/or the air stream from the fresh-air intake is cut off if necessary. In addition to use by itself, this safety device can of course also be used in combination with the gas sensor according to the older patent application and the advantageous embodiments mentioned therein, thus increasing redundancy and safety.

In one advantageous embodiment of the invention the pressure sensor is provided with a time-differentiating measurement curve so that it responds only to rapid pressure changes, and not to slow ones. In other words, this embodiment responds only to pressure changes that exceed a presettable time pressure gradient. As a result, slow pressure changes related to operation are disregarded, as are minor leaks that pose no risk to the occupants. Unnecessary or avoidable response of the warning device can thus be avoided.

In addition, it can be advantageous for the blower that delivers fresh air to be automatically adjustable for maximum delivery in the event the pressure sensor responds. This results in maximum dilution with air of the vapors formed or escaping, and brings the resultant vapor/air mixture below a concentration that can be ignited.

Another advantageous embodiment includes a control device which has the vapor pressure curve of the refrigerant stored therein, and the evaporator is provided with a temperature sensor. The presettable response threshold of the pressure sensor can thus be adjusted automatically and continuously by the control device as a function of the evaporator temperature in such fashion that the pressure at the pressure sensor that corresponds to the response threshold is always below the respective working point of the vapor pressure curve of the air conditioner. As a result, a false alarm caused by a decrease in refrigerant pressure during normal operation can be avoided. (The refrigerant pressure normally drops at lower outside temperatures.)

Other objects, advantages and novel features of the present invention will become apparent from the following detailed description of the invention when considered in conjunction with the accompanying drawings.

BRIEF DESCRIPTION OF THE DRAWINGS

The single FIGURE of the drawing is a schematic diagram of an air conditioner for motor vehicles according to the present invention.

DETAILED DESCRIPTION OF THE DRAWING

The air conditioner shown in the drawing comprises, in the usual fashion, a compressor 11, a condenser 12, an expansion valve 13, and an evaporator 14, all connected in a refrigerant circuit 15 and traversed in the above sequence by a refrigerant. Refrigerant circuit 15 is formed by lines connecting the above-mentioned elements. In addition, the air conditioner contains in the usual fashion a temperature sensor 36 on the evaporator and a pressure sensor 33 on the high-pressure side of the circuit. Evaporator 14 is located in an air distribution duct 16 and occupies the entire air throughput cross section. Air distribution duct 16 is connected to the outlet of a blower 17 whose intake can be connected by means of a recirculation flap 18 alternately with a fresh air intake 19 or an exhaust opening 20 in interior 21 of the motor vehicle. Exhaust opening 20 is located in the end wall of interior 21 indicated by the number 22 while fresh air intake 19 is located in the wall of a radiator tank 34 mounted on blower 17, said intake 19 communicating with the outside air through an air grille 23 in engine hood 24. An air filter is indicated by 25. Recirculation flap 18 is actuated by an electric positioning motor 26 and alternatively opens fresh air intake 19 to draw in fresh air from outside through the blower or opens exhaust opening 20 to draw in air from interior 21.

The air conditioner includes a so-called air conditioning operating device 29 that also comprises control electronics. This operating device not only allows the air conditioner to be switched on and off manually but also operates the air conditioner automatically and independently on the basis of a certain "intelligence" of the operating device as a function of the signals from installed sensors, in a manner known to those skilled in the art.

When the air conditioner is switched on or off, compressor 11 is started or stopped. The refrigerant used in the refrigerant circuit is a hydrocarbon which has good thermodynamic properties but is flammable when combined with air. A mixture of propane and butane can be used, for example. Certain precautions are taken in the refrigerant circuit and in the air conditioner operating device to avoid endangering the occupants owing to the flammability of the refrigerant. Thus, the signals from temperature sensor 36 and pressure sensor 33 on the high-pressure side are input to the air conditioner operating device.

According to the invention, an additional pressure sensor 35 is provided on the low-pressure side of the refrigerant circuit, specifically in the immediate vicinity of evaporator 14, downstream between the latter and expansion valve 13. The signal output of this sensor is also connected on the input of the air conditioner operating device. This pressure sensor 35 is wired so that it is active only when the vehicle is in use, but the air conditioner is not running. Pressure sensor 35 then reacts to any leak-produced pressure drop in refrigerant circuit 15 and, if the pressure drop is inadmissibly severe or rapid, delivers an electrical detection signal to air conditioner operating device 29.

Based on detection signals from the sensors, and as a function thereof, air conditioner operating device 29 generates activation signals that may be applied to different outputs. These outputs are connected with an electrical and acoustic warning device 32, blower motor 37, and positioning motor 26 for recirculation flap 18. The intervention of the air conditioning operating device at various points in the air conditioning system is intended to prevent the escape of refrigerant from refrigerant circuit 15, which can enter interior 21 with the air stream through air distribution duct 16. It thus prevents refrigerant from collecting in the vehicle interior and forming a flammable mixture with the interior air that could considerably endanger the vehicle occupants.

In response to the detection signal, air conditioner operating unit 29 initially generates a signal which activates the optical and acoustic warning device 32, making the driver aware of the defect in the air conditioner. In addition, air conditioner operating device 29 also generates a positioning signal for recirculation flap 18 that is directed to its positioning motor 26 to turn it on long enough for recirculation flap 18 to assume the position shown in the drawing, in which exhaust air opening 20 of interior 21 is completely closed and blower inlet 17 is in communication with fresh air intake 19. In the event of a leak, therefore, an automatic switch to fresh air operation takes place. Moreover, in the case of the response of low-pressure-side pressure sensor 35 to air conditioner operating device 29, blower 17 is automatically set for maximum delivery by means of blower motor 37 controlled by said device, so that any escaping vapor is diluted to the greatest possible extent with air and makes the resultant mixture no longer capable of being ignited.

In an advantageous embodiment, pressure sensor 35 is equipped with a time-differentiation measurement curve so that it does not react to slow pressure changes. Instead, it responds only to relatively rapid pressure changes, with a time pressure gradient above a presettable valve. As a result, slow pressure changes related to normal operation are ignored, as are minor leaks that pose no danger to the occupants. Unnecessary or avoidable response of the warning device can thus be avoided.

The vapor pressure curve of the refrigerant used is stored in air conditioner operating device 29. Evaporator 14 is also provided with the above-mentioned temperature sensor 36, and the pressure sensor 35 is also designed so that its response threshold is remotely controlled by air conditioner operating device 29 and is automatically presettable and can be changed at any time. Consequently, the response threshold of pressure sensor 35 can be adjusted automatically and continuously as a function of evaporator temperature in such manner that the response pressure value of the pressure sensor is always below the respective working point of the vapor pressure curve of the air conditioner. In this way, a false alarm caused by a drop in refrigerant pressure related to normal operation can be avoided. (Refrigerant pressure regularly drops at lower outside temperatures.)

On the other hand, if the air conditioner is operating, pressure sensor 35 on the evaporator is not active. If a leak develops with the air conditioner in the operationally ready state and a pressure drop occurs as a result, the air conditioner will be shut off by the signal from pressure sensor 33, usually provided on the high-pressure side. The control signals generated by air conditioner operating device 29 for blower 17, recirculation flap 18, and warning device 32 are the same as in the case of the shut-off air conditioner described above.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. Air conditioner for a motor vehicle comprising:

a refrigerant circuit including a compressor, a condenser, an expansion valve, and an evaporator, all traversed in sequence by a refrigerant in said refrigerant circuit;

an air distribution duct that leads to an interior of the vehicle in which duct the evaporator is located and can be exposed to an air stream;

a servo-controlled flap for controlling a flow of fresh air or recirculated air in said air duct;

a first pressure sensor mounted on a high-pressure side of the refrigerant circuit; and a second pressure sensor mounted on the low-pressure side of the refrigerant circuit, that conducts the refrigerant in vapor form, to detect the refrigerant pressure in the vicinity of the evaporator;

said pressure sensors, in the event of a drop in refrigerant pressure below a minimally acceptable limiting value that can be preset separately for each pressure sensor, generating a pressure signal that switches the flap control servo for the air stream, if it is not already so set, to fresh air intake, said first pressure sensor being operational when the air conditioner is switched on and said second pressure sensor being operational when the air conditioner is not switched on.

2. Air conditioner according to claim 1 wherein at least said second pressure sensor is equipped with a time-differentiation measurement curve, whereby it responds only to rapid pressure changes, with a pressure gradient above a presettable time pressure gradient.

3. Air conditioner according to claim 1 wherein when at least one of said first and second pressure sensors responds, a blower in said air distribution duct is adjusted to deliver fresh air automatically at a maximum delivery level thereof.

4. Air conditioner according to claim 1 further comprising an air conditioner operating device with a vapor pressure curve of said refrigerant stored therein, wherein:

the evaporator is provided with a temperature sensor; and a presettable response threshold of pressure sensor can be adjusted automatically and continuously by the air conditioner operating device as a function of evaporator temperature whereby pressure at the second pressure sensor that corresponds to the response threshold is always below a respective working point of the vapor pressure curve of the air conditioner.

5. Air conditioner according to claim 1 wherein said second pressure sensor is activated only when said vehicle is operated with the air conditioner switched off.

* * * * *